Aug. 29, 1961     E. R. ZIEGLER     2,997,727

WINDSHIELD WIPER ARM

Filed Oct. 28, 1959     2 Sheets-Sheet 1

INVENTOR.
EUGENE R. ZIEGLER
BY
W. E. Finken
HIS ATTORNEY

Aug. 29, 1961 E. R. ZIEGLER 2,997,727
WINDSHIELD WIPER ARM
Filed Oct. 28, 1959 2 Sheets-Sheet 2

INVENTOR.
EUGENE R. ZIEGLER
BY
HIS ATTORNEY

United States Patent Office
2,997,727
Patented Aug. 29, 1961

2,997,727
WINDSHIELD WIPER ARM
Eugene R. Ziegler, Spencerport, N.Y., assignor to General Motors Corporation, Detroit, Mich., a corporation of Delaware
Filed Oct. 28, 1959, Ser. No. 849,390
8 Claims. (Cl. 15—250.35)

This invention pertains to the art of windshield cleaning, and particularly to an infinitely angularly adjustable wiper arm construction.

Heretofore, it has been proposed to incorporate an infinitely angularly adjustable blade carrying section in a wiper arm to facilitate accurate positioning of the wiper blade against the lower reveal molding in the parked position thereof. A wiper arm construction of this type is disclosed in copending application, Serial No. 842,636, filed September 28, 1959, in the name of Bratton et al. and assigned to the assignee of this invention. The present invention relates to an improved wiper arm construction of the aforesaid type including improved means for pivotally interconnecting the intermediate and outer arm sections and improved means for drivingly connecting the inner arm section to the spindle of an actuating shaft. Accordingly, among my objects are the provision of a wiper arm construction having an infinitely angular blade carrying section; the further provision of a wiper arm including a socket section, an intermediate section spring hinge connected thereto and an outer blade carrying section supported for pivotal movement relative to the intermediate section; and the still further provision of improved means for attaching a wiper arm to an actuating shaft including clamp means which, when released, permit infinitely angular adjustment of the arm relative to the shaft.

The aforementioned and other objects are accomplished in the present invention by utilizing tabs to pivotally support the blade carrying section for movement relative to the intermediate section, and incorporating a strap-type clamp in the socket section for locking the socket section to the spindle of the actuating shaft. Specifically, the wiper arm is adapted for driving connection to a burr, or spindle, which may either be longitudinally serrated or smooth. The wiper arm includes an inner section having a socket recess adapted to receive the spindle, a spring metal strap-type clamp being disposed within the socket and having radially extending flanged ends. One of the ends is adapted to support a nut and the other end engages a boss in the inner arm section. The inner arm section is also formed with another boss disposed between the flanged ends of the clamp to prevent excessive distortion thereof. A screw extends through the ends of the clamp which threadedly engages the nut whereby the clamp can be tightened about the spindle on the actuating shaft. When the clamp screw is loosened, the inner arm section can be infinitely angularly adjusted relative to the actuating shaft, and when the clamp screw is tightened, the inner arm section is securely locked for movement with the actuating shaft.

The inner arm section comprising a die casting, is spring hinge connected to the inner arm section composed of channel-shaped sheet metal. An outer blade carrying section is disposed within the side walls of the intermediate section and is supported for pivotal movement relative thereto adjacent the outer end of the intermediate section by a pair of integral tabs which are either sheared, or pinched, down in the inwardly turned portions of the side walls of the channel-shaped section. The top wall of the intermediate section is formed with an arcuate slot adjacent the inner end thereof through which a screw projects, the screw being threadedly engaged with the inner end of the blade carrying section. When the screw is loosened, the blade carrying section can be adjusted to the desired angular position, and when the screw is tightened the blade carrying section is securely locked to the intermediate section.

In a modified embodiment, the outer arm section is pivotally supported by a clamp and nut arrangement which eliminates the elongate slot in the intermediate arm section and the tapped hole in the outer arm section.

Further objects and advantages of the present invention will be apparent from the following description, reference being had to the accompanying drawings, wherein preferred embodiments of the present invention are clearly shown, and wherein similar numerals depict similar parts throughout the several views.

Figure 2:
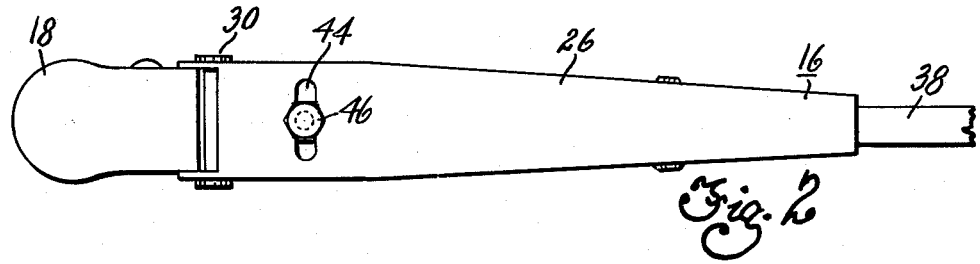
FIGURE 2 is a fragmentary top view of the improved wiper arm construction.
Figure 3:
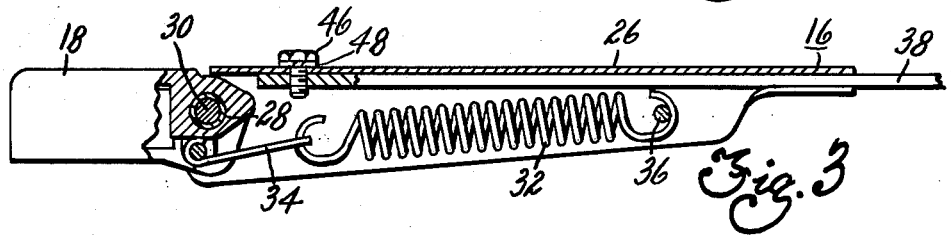
FIGURE 3 is a fragmentary view, partly in section and partly in elevation, of the improved wiper arm construction.
Figure 4:
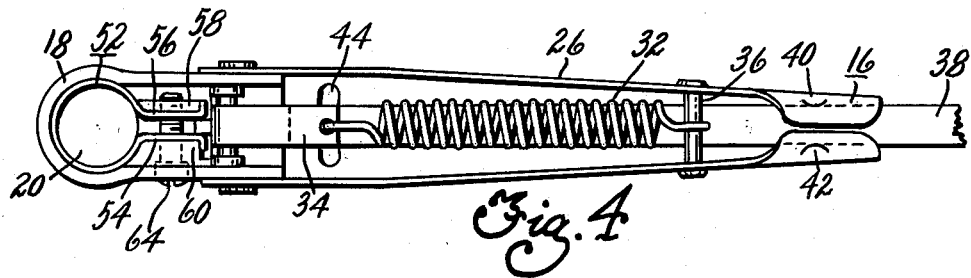
FIGURE 4 is a fragmentary bottom view of the improved wiper arm construction.
Figure 1:
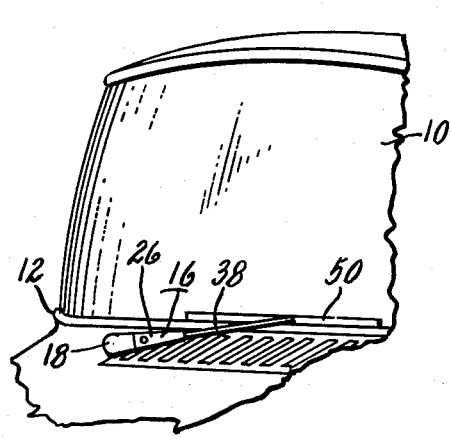
FIGURE 1 is a fragmentary view, in elevation, of a vehicle equipped with the windshield wiper arm of the present invention.
Figure 5:
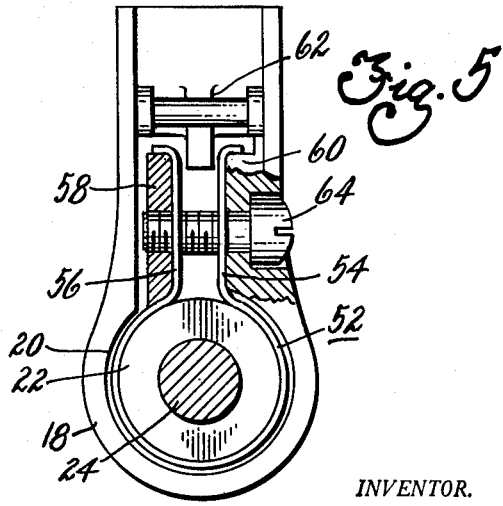
FIGURE 5 is an enlarged view, partly in section and partly in elevation, of the inner arm section depicting the clamp-type locking means.

With particular reference to FIGURE 1, a portion of a vehicle is shown including a windshield 10 having a lower reveal molding 12. A pivot, or actuating, shaft, not shown in FIGURE 1, extends through the vehicle cowl on each side of the vehicle, a wiper arm 16 being drivingly connected to each pivot shaft. With reference to FIGURES 2 through 4, the wiper arm 16 includes a die cast inner section 18 having a socket recess 20 adapted to receive a burr, or spindle, 22 attached to the pivot shaft 24, as seen in FIGURE 5.

The wiper arm 16 includes a channel-shaped intermediate arm section 26, the side walls of which straddle the outer end of the inner arm section 18. The outer end of the inner arm section is formed with a transverse bore which receives a bushing 28, as seen in FIGURE 3. A rivet 30 is inserted through aligned openings in the side walls of the intermediate section 26 and through the bushing 28 to pivotally interconnect the sections 18 and 26 for relative movement about an axis transverse to the pivot shaft 24. In addition, the sections 18 and 26 are interconnected by a tension spring 32, the inner end of which engages a spring retainer 34 pivotally mounted on the inner arm section, and the outer end of which engages a pin 36 attached to the intermediate arm section.

An elongate outer, or blade carrying, section 38 which is substantially rectangular in cross section, is located between the side walls of the intermediate section 26. The width of the blade carrying section 38 is less than the space between the side walls of the intermediate section as clearly shown in FIGURES 2 and 4. The section 38 is supported for pivotal movement relative to the intermediate arm section by means of a pair of tabs 40 and 42 sheared down or pinched in the inwardly turned ends of the side walls of the intermediate section 26 as shown in FIGURE 4. The tabs 40 and 42 engage the edges of the outer arm section 38 and effectively support the outer arm section 38 for movement about an axis normal to the longitudinal axis of the wiper arm.

The top wall of the channel-shaped intermediate arm section 26 is formed with an elongate arcuate slot 44, the axis of which is coincident with the axis formed by the tabs 40 and 42. A cap screw 46 having threaded engagement with the outer arm section 38 extends through the slot 44, a lock washer 48 being interposed between the head of the cap screw and the top of the intermediate arm section. The arm section 38 is adapted to carry a wiper blade such as indicated by numeral 50 in FIGURE 1.

With reference to FIGURE 5, the manner in which the inner arm section is drivingly connected to the spindle 22 of the actuating shaft 24 will be described. The spindle 22 may have either a smooth outer surface or have longitudinal serrations thereon. A strap-type spring metal clamp 52 is located within the inner arm section 18 within the socket recess 20. The clamp 52 has radially extending flanged ends 54 and 56. The end 56 supports a nut 58, and the end 54 engages an integral boss 60 on the inner arm section 18. The inner arm section 18 is also formed with an integral boss 62 disposed between the ends 54 and 56 of the clamp 52 which prevents excessive distortion of the clamp upon tightening of a screw 64 which threadedly engages the nut 58 and extends through aligned openings in the ends of the clamp. When the screw 64 is loosened, the ends of the clamp spread to facilitate attachment or removal of the inner arm section from the spindle 22. Moreover, when the screw 64 is loosened, the arm can be infinitely angularly adjusted relative to the spindle 22. When the screw 64 is tightened, the clamp is drawn about the spindle 22 so as to securely lock the inner arm section to the spindle. The flanged end 56 of the clamp prevents turning of the nut 58 and the flanged end 54 prevents turning of the clamp 52.

Referring again to FIGURE 1, the blade carrying section 38 can also be infinitely adjusted throughout a limited arc as permitted by the space between the side walls of the intermediate section 26. This movement of the inner arm section about the axis spaced from and parallel to the axis of the pivot shaft 24 facilitates accurate positioning of the blade in a flush position against the lower reveal molding 12 when the wiper blade is in a parked position. The outer arm section 38 can be adjusted by loosening the screw 46, and after the adjustment has been made the outer arm section can be securely locked by tightening the cap screw 46.

Figure 6:
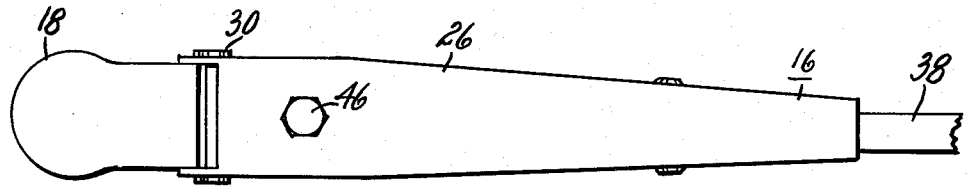
FIGURE 6 is a fragmentary top view of a modified arm construction.
Figure 7:
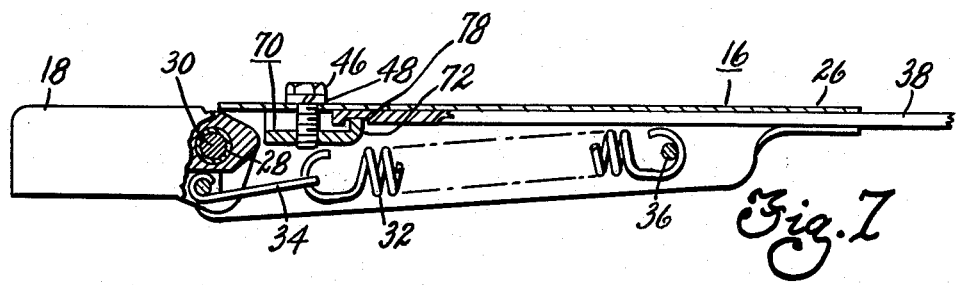
FIGURE 7 is a fragmentary view, partly in section and partly in elevation of the arm of FIGURE 6.
Figure 8:
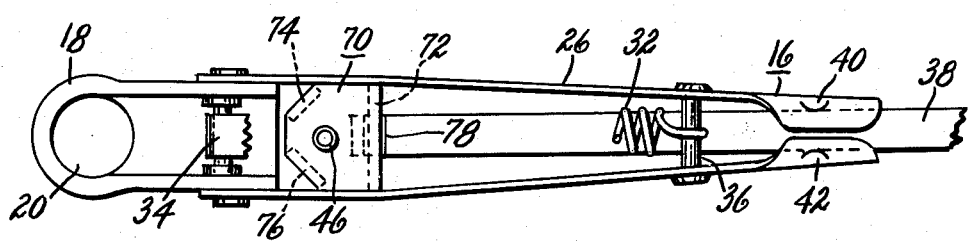
FIGURE 8 is a fragmentary bottom view of the arm of FIGURE 6.

With reference to FIGURES 6 through 8, a modified wiper arm construction is disclosed wherein the inner arm section 18 is pivotally connected to the intermediate arm section 26 by pin 30. The outer arm section 38 is supported for pivotal movement relative to the section 26 by tabs 40 and 42 as previously described. However, the section 26 has only a circular hole therethrough for receiving screw 46. The screw 46 threadedly engages a combined nut and clamp 70. The combined nut and clamp has an upwardly extending flange 72 and a pair of upstanding ears 74 and 76. The flange 72 engages a groove 78 in the outer arm section 38, the groove 78 being wider than the flange thickness as shown in FIGURE 7.

The ears 74 and 76 engage the inner surface of the section 26 when the screw 46 is tightened so that the combined nut and clamp 70 will securely hold the outer arm section 38 in its adjusted position.

While the embodiments of the invention as herein disclosed constitute preferred forms, it is to be understood that other forms might be adopted.

What is claimed is as follows:

1. A windshield wiper arm including, an inner section adapted to be drivingly connected to an actuating shaft, an intermediate section of channel-shape spring hinge connected to the inner section including a top wall and spaced side walls, an outer blade carrying section pivotally connected to the intermediate section for movement about an axis normal to the longitudinal axis of the wiper arm, the blade carrying section being located between the side walls of the intermediate section and having a transverse dimension less than the distance between the side walls of the intermediate section, the pivotal connection between the intermediate section and the blade carrying section comprising integral tab means formed in the side walls of the intermediate section and engaging the edges of said blade carrying section, and means for locking the blade carrying section relative to the intermediate section.

2. A windshield wiper arm including, an inner section having a socket recess adapted to receive a spindle, clamp means carried by the inner arm section and adapted to engage the outer periphery of the spindle, means for tightening the clamp means about the spindle, an intermediate section spring hinge connected to the inner section, an elongate outer blade carrying section pivotally connected to the intermediate section for movement about an axis normal to the longitudinal axis of the wiper arm, said pivotal connection between the blade carrying section and the intermediate section being remote from the outer end of the blade carrying section whereby pivotal movement thereof varies the effective angular position of the wiper arm relative to said spindle, and means disposed adjacent the inner arm section for locking the blade carrying section relative to the intermediate section.

3. A windshield wiper arm including, an inner section adapted to be drivingly connected to an actuating shaft, an intermediate section spring hinge connected to the inner section, an outer blade carrying section pivotally connected to the intermediate section for movement about an axis normal to the longitudinal axis of the wiper arm, and locking means adjacent the inner arm section for fastening the blade carrying section to the intermediate section, said locking means comprising a screw and a clamp having threaded engagement with said screw and clamping engagement with said blade carrying section.

4. The windshield wiper arm set forth in claim 3 wherein the inner end of said blade carrying section is formed with a transverse groove, and wherein said clamp has a flange engageable with said groove.

5. The windshield wiper arm set forth in claim 3 wherein said clamp has a pair of upwardly extending ears arranged to engage the inner surface of said intermediate section to securely fasten the outer arm section in the adjusted position.

6. A windshield wiper arm including, an inner section adapted to be drivingly connected to an actuating shaft, an intermediate section of channel shape spring hinge connected to the inner section including a top wall and spaced side walls, an outer blade carrying section pivotally connected to the intermediate section for movement about an axis normal to the longitudinal axis of the wiper arm, a portion of the blade carrying section being located between the side walls of the intermediate section and having a transverse dimension less than the distance between the side walls of the intermediate section, the pivotal connection between the intermediate section and the blade carrying section comprising integral tab means formed in the side walls of the intermediate section and engaging the edges of the blade carrying section, and locking means disposed adjacent the inner arm section and rigidly connecting the blade carrying section to the intermediate section.

7. A windshield wiper arm including, an inner section adapted to be drivingly connected to an actuating shaft, an intermediate section of channel shape spring hinge connected to the inner section including a top wall and spaced side walls, an outer blade carrying section pivotally connected to the intermediate section for movement about an axis normal to the longitudinal axis of the wiper arm, and locking means adjacent the inner arm section for fastening the blade carrying section to the intermediate section, said locking means comprising a screw extending through the top wall of said intermediate section and a clamp confined between the side walls of said intermediate section and having threaded engagement with said screw and clamping engagement with said blade carrying section.

8. A windshield wiper arm including, an inner section adapted to be drivingly connected to an actuating shaft, an intermediate section spring hinge connected to the inner section, an outer blade carrying section pivotally connected to the intermediate section for movement about an axis normal to the longitudinal axis of the wiper arm, said intermediate section being of channel shape including a top wall and spaced side walls, a portion of the blade carrying section being located between the side walls of the intermediate section and having a transverse dimension less than the distance between the side walls of the intermediate section, the pivotal connection between the intermediate section and the blade carrying section comprising integral tab means formed in the side walls of the intermediate section adjacent the outer end thereof and engaging the edges of said blade carrying section, and locking means adjacent the inner arm section for fastening the blade carrying section to the intermediate section comprising a screw and a clamp, said clamp having threaded engagement with said screw and clamping engagement with said blade carrying section.

References Cited in the file of this patent

UNITED STATES PATENTS

| | | |
|---|---|---|
| 592,647 | Davis | Oct. 26, 1897 |
| 2,295,620 | Zaiger | Sept. 15, 1942 |